US008000595B2

(12) United States Patent
Katagiri

(10) Patent No.: US 8,000,595 B2
(45) Date of Patent: Aug. 16, 2011

(54) OPTICAL RECEIVER, OPTICAL COMMUNICATION DEVICE, AND OPTICAL SIGNAL RECEIVING METHOD

(75) Inventor: Toru Katagiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 735 days.

(21) Appl. No.: 12/056,804

(22) Filed: Mar. 27, 2008

(65) Prior Publication Data

US 2008/0240738 A1 Oct. 2, 2008

(30) Foreign Application Priority Data

Mar. 28, 2007 (JP) ................................. 2007-084109

(51) Int. Cl.
*H04B 10/06* (2006.01)
(52) U.S. Cl. ...................................................... 396/209
(58) Field of Classification Search ............ 398/202–214
See application file for complete search history.

(56) References Cited

U.S. PATENT DOCUMENTS

| 7,356,256 | B1 * | 4/2008 | Strawczynski et al. .......... 398/33 |
| 7,684,712 | B1 * | 3/2010 | Roberts et al. ................. 398/208 |
| 2006/0193640 | A1 | 8/2006 | Katagiri et al. ................ 398/188 |

FOREIGN PATENT DOCUMENTS

JP 2006-270909 10/2006

* cited by examiner

*Primary Examiner* — Leslie Pascal
(74) *Attorney, Agent, or Firm* — Staas & Halsey LLP

(57) ABSTRACT

An optical receiver including a demodulator to convert an in-phase signal of a received differential phase modulated optical signal into a first electrical signal, and to convert a quadrature signal of the received differential phase modulated optical signal into a second electrical signal; a decision member deciding logic states of the first and second electrical signals; a logic controller using the decision result of the decision member to control logic states of the first and second electrical signals; and a memory storing information relating to the decision result. The logic controller controls the logic state using the information relating to the decision result stored in the memory.

14 Claims, 15 Drawing Sheets

FIG. 3

| | | A ch. | | | |
|---|---|---|---|---|---|
| | | $Q_k$ | $\overline{Q_k}$ | $\overline{I_k}$ | $I_k$ |
| B ch. | $Q_k$ | × | × | ○ | ◎ |
| | $\overline{Q_k}$ | × | × | ○ | ○ |
| | $\overline{I_k}$ | △ | △ | × | × |
| | $I_k$ | ◇ | △ | × | × |

| PAGE NO. P | COMPARISON PATTERN (16 bits) | LOGIC INVERSION | | BS | INTER-FERO-METER |
|---|---|---|---|---|---|
| | | ODD ch. | EVEN ch. | | |
| 1 | 1111 1100 0000 0000 | | | | ✓ |
| 2 | 1010 1001 0101 0101 | | | | ✓ |
| 3 | 1010 1100 0100 0001 | | ✓ | ✓ | |
| 4 | 1111 1001 0001 0100 | | | ✓ | |
| 5 | 0101 0110 1010 1010 | | | | ✓ |
| 6 | 0000 0011 1111 1111 | | | | ✓ |
| 7 | 0000 0110 1110 1011 | ✓ | ✓ | ✓ | |
| 8 | 0101 0011 1011 1110 | ✓ | | ✓ | |
| 9 | 0101 1100 1000 0010 | ✓ | | | |
| 10 | 0000 1001 1101 0111 | ✓ | ✓ | | |
| 11 | 0000 1100 1100 0011 | | | | ✓ |
| 12 | 0101 1001 1001 0110 | | | | ✓ |
| 13 | 1111 0110 0010 1000 | | | | |
| 14 | 1010 0011 0111 1101 | | ✓ | | |
| 15 | 1010 0110 0110 1001 | | | | ✓ |
| 16 | 1111 0011 0011 1100 | | | | ✓ |

|  | ODD ch. | | | |
|---|---|---|---|---|
|  |  | Qk | $\overline{Qk}$ | $\overline{Ik}$ | Ik |
| EVEN ch. | Qk | × | × | ○ | ◎ |
|  | $\overline{Qk}$ | × | × | ○ | ○ |
|  | $\overline{Ik}$ | △ | △ | × | × |
|  | Ik | ◇ | △ | × | × |

820

|  | ODD ch. | | | |
|---|---|---|---|---|
|  |  | Qk | $\overline{Qk}$ | $\overline{Ik}$ | Ik |
| EVEN ch. | Qk+1 | × | × | △ | ◇ |
|  | $\overline{Qk+1}$ | × | × | △ | △ |
|  | $\overline{Ik+1}$ | ○ | ○ | × | × |
|  | Ik+1 | ◎ | ○ | × | × |

FIG. 9

| PAGE NO. p | COMPARISON PATTERN (16 bits) | DELAY STATE (1) | | | | DELAY STATE (2) | | | | |
|---|---|---|---|---|---|---|---|---|---|---|
| | | 1D | LOGIC INVERSION | | BS | INTER-FERO-METER | 1D | LOGIC INVERSION | | BS | INTER-FERO-METER |
| | | | ODD ch. | EVEN ch. | | | | ODD ch. | EVEN ch. | | |
| 1 | 1111 1100 0000 0000 | | | | | ✓ | | | | | ✓ |
| 2 | 1010 1001 0101 0101 | | | | | ✓ | | | | | ✓ |
| 3 | 1010 1100 0100 0001 | | | ✓ | ✓ | | ✓ | | ✓ | ✓ | |
| 4 | 1111 1001 0001 0100 | | | | ✓ | | ✓ | | | ✓ | |
| 5 | 0101 0110 1010 1010 | | | | | ✓ | | | | | ✓ |
| 6 | 0000 0011 1111 1111 | | | | | ✓ | | | | | ✓ |
| 7 | 0000 0110 1110 1011 | ✓ | ✓ | ✓ | | | ✓ | ✓ | ✓ | ✓ | |
| 8 | 0101 0011 1011 1110 | ✓ | | ✓ | | | ✓ | ✓ | | ✓ | |
| 9 | 0101 1100 1000 0010 | ✓ | | | | | ✓ | ✓ | | | |
| 10 | 0000 1001 1101 0111 | ✓ | ✓ | | | | ✓ | ✓ | ✓ | | |
| 11 | 0000 1100 1100 0011 | | | | | ✓ | | | | | ✓ |
| 12 | 0101 1001 1001 0110 | | | | | ✓ | | | | | ✓ |
| 13 | 1111 0110 0010 1000 | | | | | | | | | | |
| 14 | 1010 0011 0111 1101 | | ✓ | | | | ✓ | | ✓ | | |
| 15 | 1010 0110 0110 1001 | | | | | ✓ | | | | | ✓ |
| 16 | 1111 0011 0011 1100 | | | | | ✓ | | | | | ✓ |

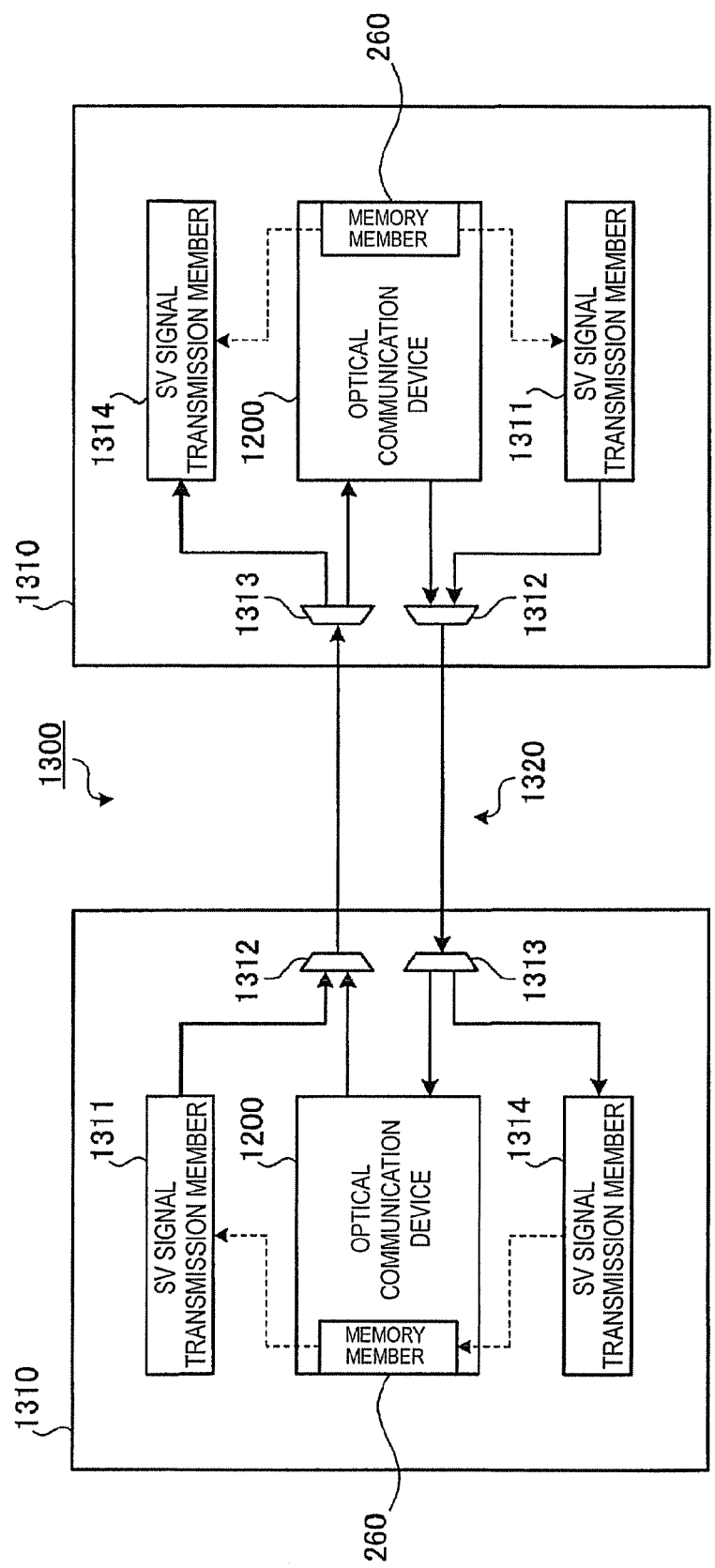

FIG. 14

| PAGE NO. P | COMPARISON PATTERN (16 bits) | DELAY STATE (1) | | | | | DELAY STATE (2) | | | | | TRANSMISSION SIDE | RECEPTION SIDE | |
|---|---|---|---|---|---|---|---|---|---|---|---|---|---|---|
| | | 1D | LOGIC INVERSION ODD ch. | LOGIC INVERSION EVEN ch. | BS | INTER-FERO-METER | 1D | LOGIC INVERSION ODD ch. | LOGIC INVERSION EVEN ch. | BS | INTER-FERO-METER | PHASE MODU-LATION MEMBER | A-arm SIDE | B-arm SIDE |
| 1 | 1111 1100 0000 0000 | | | | | ✓ | | | | | ✓ | — | — | — |
| 2 | 1010 1001 0101 0101 | | | | | ✓ | | | | | ✓ | — | — | — |
| 3 | 1010 1100 0100 0001 | | | ✓ | ✓ | | | | | | | +π/2 | +7π/4 | +5π/4 |
| 4 | 1111 1001 0001 0100 | ✓ | | | ✓ | | | | | | | −π/2 | +π/4 | −π/4 |
| 5 | 0101 0110 1010 1010 | | | | | ✓ | | | | | ✓ | — | — | — |
| 6 | 0000 0011 1111 1111 | | | | | ✓ | | | | | ✓ | — | — | — |
| 7 | 0000 0110 1110 1011 | | ✓ | | | | ✓ | ✓ | | | | −π/2 | +5π/4 | +3π/4 |
| 8 | 0101 0011 1011 1110 | | ✓ | | | | ✓ | | ✓ | | | +π/2 | +3π/4 | +π/4 |
| 9 | 0101 1100 1000 0010 | | | | | ✓ | ✓ | | ✓ | | | −π/2 | +3π/4 | +π/4 |
| 10 | 0000 1001 1101 0111 | | | | | | ✓ | | ✓ | | | +π/2 | +5π/4 | +3π/4 |
| 11 | 0000 1100 1100 0011 | | | | | ✓ | | | | | ✓ | — | — | — |
| 12 | 0101 1001 1001 0110 | | | | | ✓ | | | | | ✓ | — | — | — |
| 13 | 1111 0110 0010 1000 | | | ✓ | | | | ✓ | | | | +π/2 | +π/4 | −π/4 |
| 14 | 1010 0011 0111 1101 | ✓ | | | | | | | | | | −π/2 | +7π/4 | +5π/4 |
| 15 | 1010 0110 0110 1001 | | | | | ✓ | | | | | ✓ | — | — | — |
| 16 | 1111 0011 0011 1100 | | | | | ✓ | | | | | ✓ | — | — | — |

OPTICAL RECEIVER, OPTICAL COMMUNICATION DEVICE, AND OPTICAL SIGNAL RECEIVING METHOD

FIELD OF THE INVENTION

The present invention relates to an optical receiver, optical communication device, and optical signal receiving method for demodulation of an optical signal modulated by a differential phase modulation method.

DESCRIPTION OF THE RELATED ART

In order to handle rapidly increasing demand for data communication on data communication systems in recent years as represented by the Internet and the like, optical communication systems have been investigated which apply the intensity modulation-differential quadrature phase shift keying method (IM-DQPSK).

The conventional optical communication system comprises an optical transmission device for signal transmission of an optical signal modulated by the IM-DQPSK format and an optical receiver for demodulation of the received optical signal modulated by the IM-DQPSK format.

The phase modulator of the optical transmission device splits continuous light output from a light source and performs phase modulation using a phase modulator A and a phase modulator B. The DQPSK format modulation is performed by a $\pi/2$ phase shift of the optical signal phase modulated by the phase modulator B by $\pi/2$ or $-\pi/2$.

An intensity modulator performs intensity modulation of the DQPSK optical signal modulated by the phase modulator and performs conversion and transmission as an IM-DQPSK optical signal. The IM-DQPSK optical signal is a signal of 4 values which combines an in-phase signal and a quadrature signal (i.e., $\rho k$ and $\eta k$).

A delay interferometer A and a delay interferometer B of the demodulator of the optical receiver are controlled such that the mutual phase differential becomes $\pi/2$.

The $\rho k$ signal and the $\eta k$ signal of the DQPSK optical signal are replaced by the degree of phase shift ($\pi/2$ or $-\pi/2$) due to the $\pi/2$ phase shift of the optical transmission device. For this reason, there are 2 logic states of the electrical signal demodulated by the demodulator of the optical receiver: a state where an Ik signal is output from A channel and a Qk signal is output from B channel, and a bit swap state where a Qk signal is output from A channel and an Ik signal is output from B channel.

By combination of respective phase shifts of the delay interferometer A and the delay interferometer B of the optical receiver (i.e. ($\pi/4$, $-\pi/4$), ($3\pi/4$, $\pi/4$), ($5\pi/4$, $3\pi/4$), and ($7\pi/4$, $5\pi/4$)), the A channel output signal and the B channel output signal have 4 combinations which are logically inverted.

When the differential of the respective degrees of phase shift of the delay interferometer A and the delay interferometer B of the optical receiver is not $\pi/2$, two cases are possible: output of the Ik signal from both A channel and B channel, or output of the Qk signal from A channel and B channel. Thus, the number of logic states of the electrical signal demodulated by the demodulator of the optical receiver is 2 multiplied by 4 multiplied by 2, which is equal to 16.

SUMMARY

According to an aspect of an embodiment, an optical receiver includes a demodulator to convert to a first electrical signal of an in-phase signal a received differential phase modulated optical signal and to convert to a second electrical signal of a quadrature signal the received differential phase modulated optical signal; a decision member for decision of logic state of the first and second electrical signal converted by the demodulator; a logic controller for use of the decision result of the decision member for control of logic state of the first and second electrical signal at a desired logic state; and a memory member for storage of information relating to the decision result of the decision member. The logic controller controls the logic state using the information relating to the decision result stored by the memory member.

The above aspect of an embodiment is only intended as an example. All aspects of all embodiments are not limited to including all the features described in this example.

BRIEF DESCRIPTION OF THE DRAWINGS

FIG. 3 is a drawing illustrating an example of the logic state of the electrical signal output from the demodulator.

FIG. 4 is a drawing illustrating an example of the pattern table provided for the optical receiver according to embodiment 1.

FIG. 8 is a diagram illustrating an example of logic state of the electrical signal output from the parallel converter.

FIG. 9 is a drawing illustrating an example of the pattern table provided for the optical receiver according to embodiment 2.

FIG. 13 is a block diagram illustrating an example of the structure of the optical communication system according to embodiment 4.

FIG. 14 is a block diagram illustrating an example of the pattern table provided for the optical communication system according to embodiment 4.

DETAILED DESCRIPTION OF THE EMBODIMENT

Preferred embodiments of the optical receiver, optical communication device, and optical signal receiving method according to the present art explained in detail below while citing figures.

Embodiment 1

Figure 1:
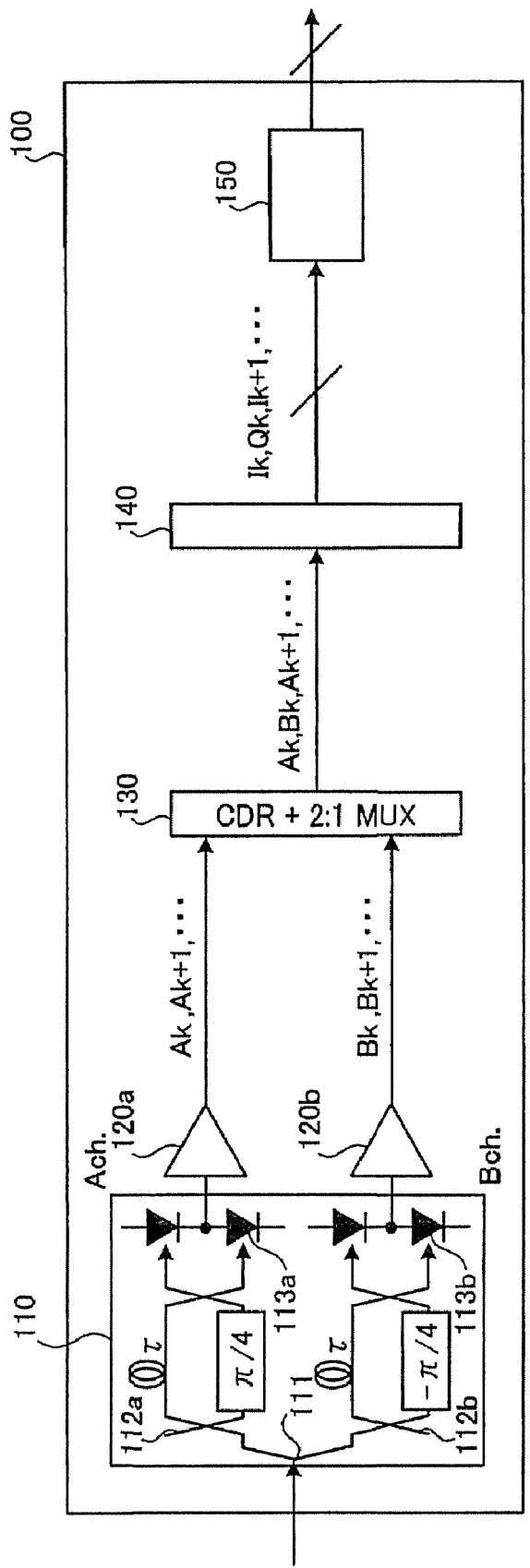
FIG. 1 is a block diagram illustrating an example of the structure of the optical receiver according to embodiment 1.

FIG. 1 is a block diagram illustrating an example of the structure of the optical receiver according to the embodiment 1. As shown in FIG. 1, an optical receiver 100 according to embodiment 1 is equipped with a demodulator 110, an amplifier 120a, an amplifier 120b, a regenerator-multiplexer (CDR+2:1 MUX) 130, a parallel converter (de-serializer) 140, and a frame processor (framer LSI) 150.

The optical receiver 100 is an optical receiver which demodulates a received optical signal modulated by the DQPSK format, for example, at 43 Gb/s. The demodulator 110 comprises a branch part 111, a delay interferometer 112a, a delay interferometer 112b, an optical-electric conversion element 113a, and an optical-electric conversion element 113b. The branch part 111 splits the received 43 Gb/s optical signal and sends output to the delay interferometer 112a and the delay interferometer 112b, respectively.

The delay interferometer 112a extracts a 21.5 Gb/s in-phase signal included in the 43 Gb/s optical signal output from the branch part 111 and sends this as output to the optical-electric conversion element 113a (A channel). The delay interferometer 112b extracts a 21.5 Gb/s quadrature signal included in the 43 Gb/s optical signal output from the splitter 111 and sends this as output to the optical-electric conversion element 113b (B channel).

The delay interferometer 112a and the delay interferometer 112b, respectively, splits the optical signal output from the branch part 111, imparts a delay τ corresponding to 1 symbol part to one of the optical branches, phase shifts that other optical branch, and combines both optical branches. The delay interferometer 112a and the delay interferometer 112b are controlled such that the mutual differential phase shift becomes $\pi/2$.

For example, the delay interferometer 112a is controlled to give a phase shift of $\pi/4$, and the delay interferometer 112b is controlled to give a phase shift of $-\pi/4$. The delay interferometer 112a or the delay interferometer 112b, for example, is a Mach-Zehnder type interferometer comprising a $LiNbO_3$ (lithium niobate) and the like electro-optical effect element or a silica glass and the like thermo-optical effect element.

The optical-electric conversion element 113a converts the in-phase signal output from the delay interferometer 112a into an electrical signal and then sends this as output to the amplifier 120a. The optical-electric conversion element 113b converts the quadrature signal output from the delay interferometer 112b into an electrical signal and then sends this as output to the amplifier 120b. The optical-electric conversion element 113a and the optical-electric conversion element 113b comprise, for example, PDs (Photo Diodes).

The amplifier 120a amplifies the in-phase signal output from the optical-electric conversion element 113a and sends output (Ak, Ak+1, . . . ) to the regenerator-multiplexer 130. The amplifier 120b amplifies the quadrature signal output from the optical-electric conversion element 113b and sends output (Bk, Bk+1, . . . ) to the regenerator-multiplexer 130. The regenerator-multiplexer 130 has a CDR (Clock and Data Recovery) function and a MUX (Multiplexer) function.

The regenerator-multiplexer 130 extracts and regenerates the data and clock from the electrical signal output from the amplifier 120a and the amplifier 120b. Also, the regenerator-multiplexer 130 multiplexes data extracted from the electrical signal output from the amplifier 120a and data extracted from the electrical signal output from the amplifier 120b and then sends output to the parallel converter 140 (Ak, Bk, Ak+1, . . . ).

The parallel converter 140 performs parallel conversion of the data output from the regenerator-multiplexer 130 into 2.7 Gb/s×16 parallel data and sends output to the frame processor 150. This parallel conversion to parallel data is not limited to 16 parallelization. The frame processor 150 performs frame synchronization processing and frame signal reception processing of parallel data output from the parallel converter 140.

Figure 2:
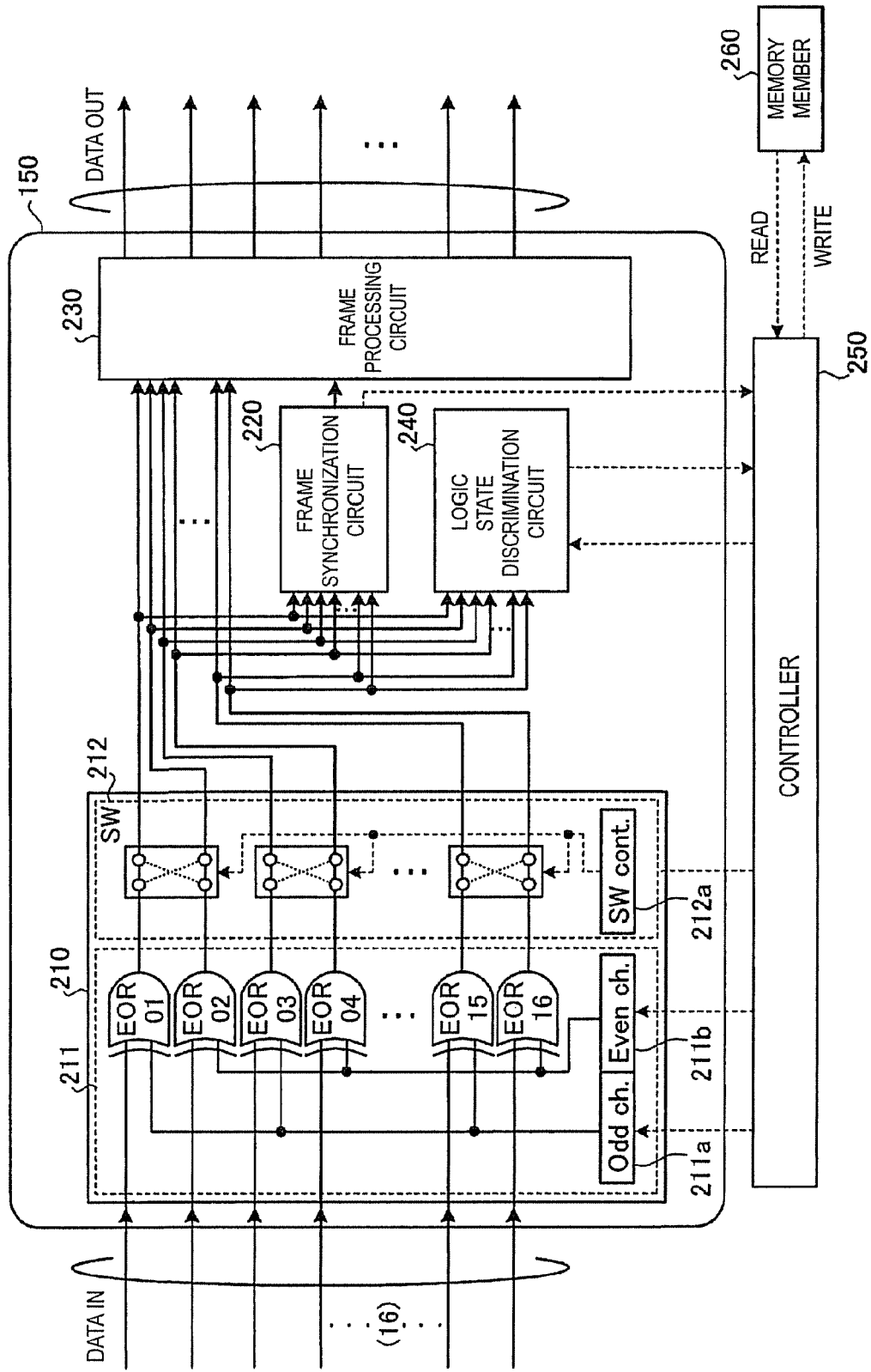
FIG. 2 is a block diagram illustrating an example of the structure of the frame processor of the optical receiver according to embodiment 1.

FIG. 2 is a block diagram illustrating an example of the structure of the frame processor of the optical receiver according to embodiment 1. As shown in FIG. 2, the frame processor 150 comprises a logic controller 210, a frame synchronization circuit 220, a frame processing circuit 230, a logic state decision circuit 240, a controller 250, and a memory member 260. The logic controller 210 comprises a logic inversion circuit 221 and a bit swap circuit 212.

The logic inversion circuit 211, based on control of the controller 250, performs logic inversion of the parallel data (data in) output from the parallel converter 140 and sends output to the bit swap circuit 212. The logic inversion circuit 211 comprises 16 EXOR (exclusive-OR) logical addition circuits (EOR01-EOR16) corresponding to the respective 16 parallel data output from the parallel converter 140, an odd channel setting member 211a (odd channel), and an even channel setting member 211b (even channel).

When the setting value of the odd channel setting member 211a changes from "0" to "1", data input to an odd EXOR logical addition circuit (EOR01, EOR03, . . . , EOR15) are subjected to logic inversion. When the setting value of the even channel setting member 211b changes from "0" to "1", data input to an even EXOR logical addition circuit (EOR02, EOR04, . . . , EOR16) are subjected to logic inversion.

The bit swap circuit 212, according to control of the controller 250, performs bit swapping of the parallel data output from the logic inversion circuit 211 and sends output to the frame synchronization circuit 220, the frame processing circuit 230, and the logic state decision circuit 240. The bit swap circuit 212 is equipped with a switch controller 212a (SW control) and 8 crossbar switches (SW) corresponding to respective pairs of the 16 parallel data (1st and 2nd, 3rd and 4th, . . . 15th and 16th) outputted from the logic inversion circuit 211.

When the setting value of the switch controller 212a changes from "0" to "1", the 8 crossbar switches are switched through the path indicated by the dashed line, and the corresponding data are switched. By this means, when the setting value of the switch controller 212a changes from "0" to "1", the 16 parallel odd bit data output from the logic inversion circuit 211 are swapped with the even bit data, respectively.

The frame synchronization circuit 220 establishes frame synchronization of the parallel data output from the logic controller 210 based on the frame synchronization bit included in the parallel data output from the logic controller 210. When the frame synchronization circuit 220 judges that frame synchronization has been established, a frame synchronization signal is output to the frame processing circuit 230 and the controller 250.

According to an OTN (Optical Transport Network) indicated in the ITU-T G.709 recommendations, a FAS (Frame Alignment Signal) is stipulated as a frame synchronization bit for an overhead member of an OTU (Optical Transport Unit).

If the optical receiver 100 transmits the optical signal based on the OTU, and if the frame synchronization circuit 220 detects OA1 ("11110110") and OA2 ("00101000") in the order OA1, OA1, OA1, OA2, OA2, OA2, then it is judged that frame synchronization has been established for the parallel data output from the logic controller 210.

For SDH (Synchronous Digital Hierarchy) and SONET (Synchronous Optical Network), frame overhead synchronization bytes A1 and A2 are frame synchronization bits corresponding to the FAS byte. When transmission of the optical signal is performed by the optical receiver 100 according to SDH and SONET, the frame synchronization circuit 220 is constructed to detect the synchronization bytes A1 and A2.

When the frame synchronization signal is output from the frame synchronization circuit 220, the frame processing circuit 230 performs frame processing (e.g. demapping processing and the like) of the parallel data output from the logic controller 210. The logic state decision circuit 240 compares the frame synchronization bit included in the 16 parallel data output from the logic controller 210 with a comparison pattern output from the controller 250, and the comparison result is output to the controller 250.

The controller 250 provides a pattern table which sets beforehand logic state control setting values and the comparison patterns. The controller 250 outputs, in order, the comparison patterns of the pattern table to the logic state decision circuit 240 until the comparison result output from the logic state decision circuit 240 becomes "match". The controller 250 controls the logic controller 201 based on the logic state control setting values corresponding to the comparison pattern when the comparison result became a "match".

Moreover, when the frame synchronization signal is output from the frame synchronization circuit 220, the controller 250 causes a write of the comparison pattern and the logic state control setting values at that time to the memory member 260 (write). Moreover, when frame synchronization is violated according to the frame synchronization circuit 220 due to a system fault and the like, the controller 250 reads out (read) the newest comparison pattern and the logic state control setting values stored in the memory member 260 and controls the logic controller 210 based on the read out setting values.

Also the controller 250 controls the phase shifts of the delay interferometer 112a and the delay interferometer 112b such that the differential of the phase shifts of the delay interferometer 112a and the delay interferometer 112b becomes $\pi/2$. The controller 250, for example, comprises a FPGA (Field Programmable Gate Array) or a CPU (Central Processing Unit).

The memory member 260, based on control of the controller 250, stores in memory the comparison pattern and the logic state control setting values. The memory member 260 may be constructed, when the new comparison pattern and logic state control setting values are written according to the controller 250, to overwrite the previously stored comparison pattern and logic state control setting values and store the new comparison pattern and logic state control setting values.

Since the controller 250 provides the previously prepared pattern table of comparison patterns and logic state control setting values, the data stored in the memory member 260 may also be either the comparison patterns or the logic state control setting values. That is to say, either is permissible as long as the logic state decision result of the logic state decision circuit 240 and the controller 250 is stored in the memory member 260. Construction of this logic state decision circuit 240, the controller 250, and the memory member as a single unit may also be considered.

FIG. 3 is a drawing illustrating an example of the logic states of the electrical signal output from the demodulator. Within FIG. 3, table 300 is a table illustrating the logic state of electrical signals output from the demodulator 110. The items of table 300 in the horizontal direction show each of the electrical signals output from the optical-electric conversion element 113a (A channel) of the demodulator 110 which consist of a normal rotation Qk signal, an inversion Qk signal, an inversion Ik signal, and a normal rotation Ik signal.

The items listed in the vertical direction of the table 300 are each of the electrical signals output from the optical-electric conversion element 113b (B channel) of the demodulator 110 which consist of a normal rotation Qk signal, an inversion Qk signal, an inversion Ik signal, and a normal rotation Ik signal. By combination of the signals from the A channel and the B channel, there are a resultant 16 types of logic state of the electrical signal output from the demodulator 110.

The symbol ⊙ indicates a desired logic state of output of the normal rotation Qk signal from B channel and output of the normal rotation Ik signal from A channel. In the case of ⊙, there is no need for control of logic state by the logic controller 210. The symbol ○ indicates the state after the output of at least the inverted Ik signal or inverted Qk signal from the A channel and/or the B channel. In the case of ○, performance of logic inversion processing by the logic controller 210 is required.

The symbol ◇ indicates the state after output of the normal rotation Qk signal from the A channel and output of the normal rotation Ik signal from the B channel. In the case of ◇, performance of bit swap processing by the logic controller 210 is required. The symbol Δ indicates the logic inversion and bit swap state. In the case of Δ, performance of logic inversion processing and bit swap processing by the logic controller 210 is required.

The symbol × indicates the state of output of the Ik signal from both the A channel and the B channel or output of the Qk signal from both. In the case of ×, control of the phase shift of the delay interferometer 112a and the delay interferometer 112b by the controller 250 is required. The controller 250 and the logic state decision circuit 240 perform decision of the logic state from among the 16 logic states of table 300 output from the demodulator 110.

FIG. 4 is a drawing illustrating an example of the pattern table provided for the optical receiver according to embodiment 1. Within FIG. 4, the first column indicates the item number P (1-6) of the comparison pattern. The second column indicates the 16 bit comparison pattern. The comparison pattern is the pattern corresponding to the frame synchronization bit included in the parallel data output from the logic controller 210.

The comparison patterns are 16 types of patterns corresponding to the 16 types of logic states shown in table 3. Items of the 3rd-6th columns indicate setting values of logic state control corresponding to each comparison pattern. The check symbol indicates a need for change of the setting value of the indicated item.

The 3rd column (logical inversion, odd channel) indicates the setting values of the odd channel setting member 211a of the logic inversion circuit 211. The 4th column (logic inversion, even channel) indicates the setting values of the even channel setting member 211b of the logic inversion circuit 211. The 5th column indicates the setting values of the switch controller 212a of the bit swap circuit 212. The 6th column indicates the control value of phase shift of the delay interferometer 112a and the delay interferometer 112b of the demodulator 110.

The controller 250 and the logic state decision circuit 240 determine the logic state of the parallel data output from the logic controller 210 depending upon which comparison pattern matches the frame synchronization bit included in the parallel data output from the logic controller 210. The controller 250 controls the logic controller 210 based on the setting values of the logic state control associated with the comparison pattern which matches the frame synchronization bit.

For example, if the frame synchronization bit is consistent with comparison pattern 3 (P=3), the controller 250 inverts setting values ("0" or "1") of the even channel setting member 211b of the logic inversion circuit 211 and the switch controller 212a of the bit swap circuit 212. If the frame synchronization bit is consistent with comparison pattern 13 (P=13), the controller 250 does not change the setting values of logic state control.

Figure 5:
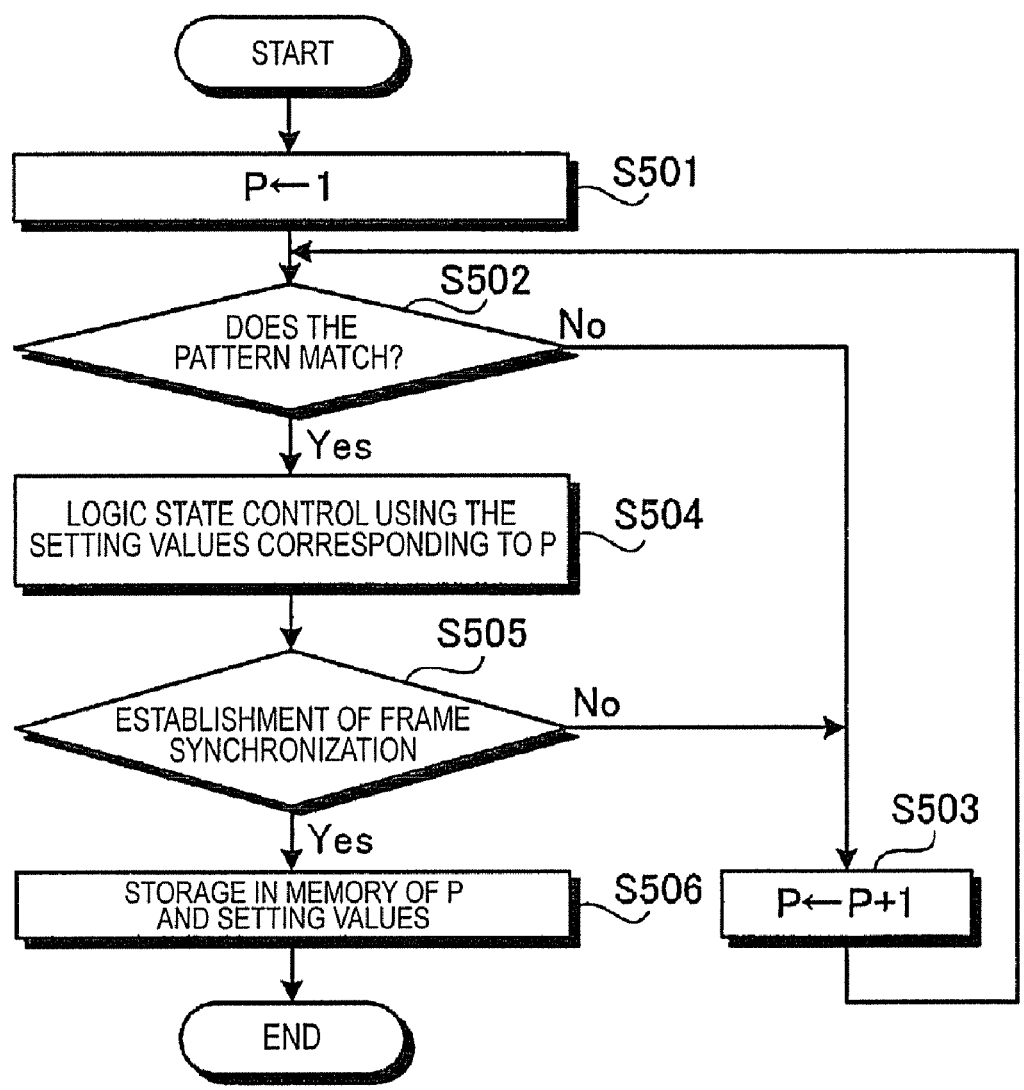
FIG. 5 is a flow chart illustrating an example of the initialization operation of the optical receiver according to embodiment 1.

FIG. 5 is a flow chart illustrating an example of the initialization operation of the optical receiver according to embodiment 1. As shown by FIG. 5, firstly, the controller 250 sets the comparison pattern P (see FIG. 4) output to the logic state decision circuit 240 to 1, and at the same time, resetting occurs for logic state control using the logic inversion circuit 211 and the bit swap circuit 212 (step S501). Thereafter, the logic state decision circuit 240 judges whether or not the comparison pattern P output from the controller 250 matches to the frame synchronization bit included in the parallel data output from the logic controller 210 (step S502).

If the frame synchronization bit and the comparison pattern P do not match during step S502 (step S502 result=No), the controller 250 sets the comparison pattern P output to the logic state decision circuit 240 to P+1 (step S503). Thereafter, processing jumps to step S502, and processing continues. When the comparison pattern P exceeds P=16 (maximum value shown in FIG. 4) during step S503, the setting becomes P=1.

When the frame synchronization bit and the comparison pattern P match during step S502 (step S502 result=Yes), the controller 250 performs control of logic state based on the setting value (see FIG. 4) corresponding to the comparison pattern P (step S504). Thereafter, the frame synchronization circuit 220 judges whether or not frame synchronization is established for the parallel data output from the logic controller 210 (step S505).

When frame synchronization is not established during step S505 (step S505 result=No), after a partial reset of the logic state control set during the above mentioned step S504 (step S507), processing continues by proceeding to step S503. If frame synchronization is established (step S505 result=Yes), the controller 250 causes storage of the comparison pattern P and the logic state control setting values by the memory member 260 (step S506) and ends the series of initialization operations.

Figure 6:
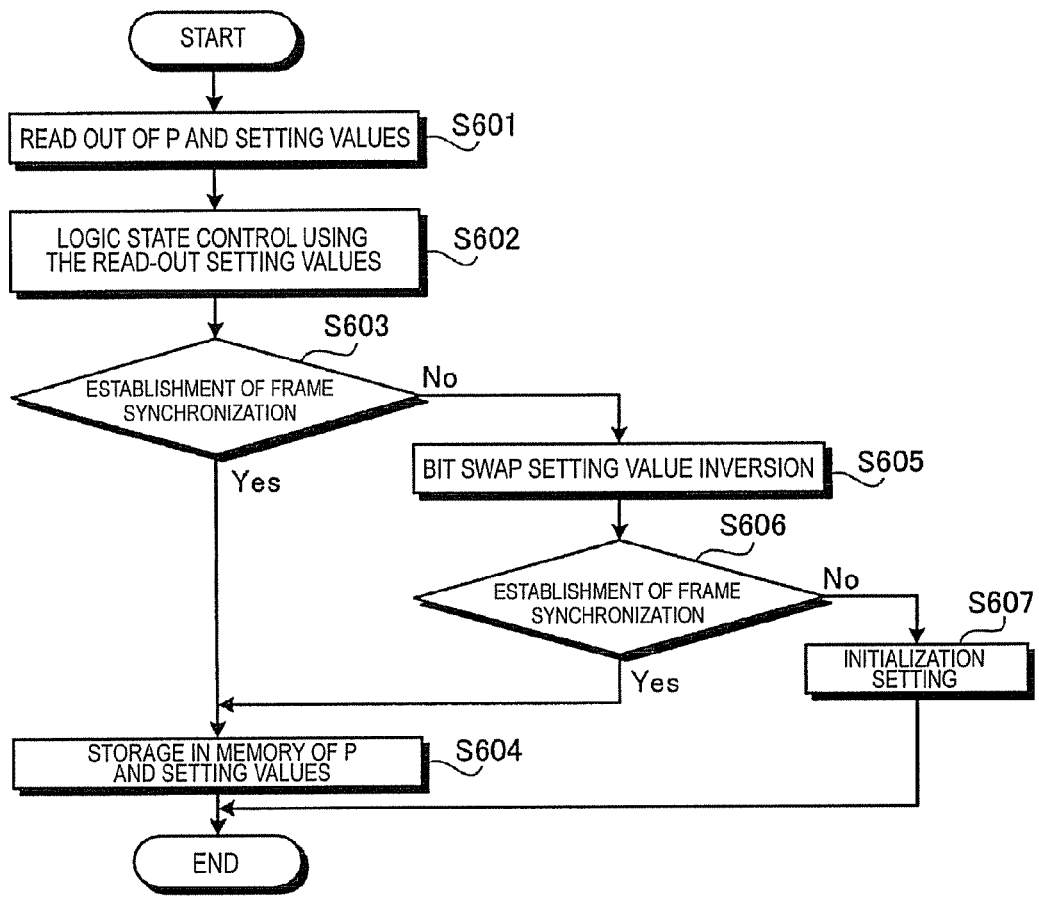
FIG. 6 is a flow chart illustrating an example of the recovery operation after a fault of the optical receiver according to embodiment 1.

FIG. 6 is a flow chart illustrating an example of the recovery operation after a fault of the optical receiver. When frame synchronization is lost according to the frame synchronization circuit 220 due to a system fault and the like, as shown in FIG. 6, the controller 250 firstly reads out the comparison pattern P and the and logic state control setting values stored by the memory member 260 (step S601).

Thereafter, the controller 250 performs control of logic state based on the logic state control setting values read out during step S601 (step S602). Thereafter, the frame synchronization circuit 220 judges whether or not frame synchronization is established for the parallel data output from the logic controller 210 (step S603).

When frame synchronization is established during step S603 (step S603 result=Yes), the controller 250 causes storage of the comparison pattern P and the logic state control values by the memory member 260 (step S604) and ends the series of recovery operations. When frame synchronization is not established (step S603 result=No), the controller 250 causes inversion of the setting values of the switch controller 212a of the bit swap circuit 212 (step S605).

Thereafter, the frame synchronization circuit 220 judges whether or not frame synchronization is established for the parallel data output from the logic controller 210 (step S606). If frame synchronization is established (step S606 result=Yes), processing continues by going to step S604. If frame synchronization is not established (step S606 result=No), the initialization operation (see FIG. 5) is repeated (step S607), and the series of recovery operations is ended.

Since control values of the phase shifts of the delay interferometer 112a and the delay interferometer 112b are basically maintained even when a system fault is generated, the setting values read out from the memory member 260 become suitable setting values for the logic inversion circuit 211. Thus, due to appropriate setting of the logic inversion circuit 211 during step S602, only the setting values of the bit swap circuit 212 are inverted during step S605.

Moreover, when processing proceeds to step S607, since the setting values of the logic state used during step S602 and step S605 were found to be unsuitable during step S603 and step S606, respectively, the set comparison patterns P of step S607 can be restricted.

For example, when the comparison pattern P corresponding to the setting values during step S602 is 3, the comparison pattern P corresponding to the setting value during step S605 becomes 14. For this reason, 3 and 14 can be eliminated as targets of comparison from the comparison patterns P during step S607. By this means, the time interval until establishment of frame synchronization can be reduced by step S607.

Moreover, it is also permissible to lower the order of priority of these comparison patterns rather than to eliminate these comparison patterns as targets of comparison.

According to the optical receiver 100 of the embodiment 1 in this manner, logic state control setting values are stored by the memory member 260 beforehand at the time of the initialization operation, and the stored setting values can be read out during the recovery operation after a fault. Thus, the time interval up until frame synchronization establishment can be shortened in comparison to the case of repeated performance of the initialization operation when a fault occurs. Thus, when a fault is generated, the time interval after the fault and until recovery can be shortened.

Even when frame synchronization was not established by the read out setting values, due to prioritization of the setting of the bit swap circuit 212 and causing of inversion, the time interval up until establishment of frame synchronization can be shortened. Even when repeated initialization setting operations are performed, due to decision of logic state by limitation of the comparison patterns, the logic state can be discriminated efficiently, and the time interval up until establishment of frame synchronization can be shortened.

Embodiment 2

Figure 7:
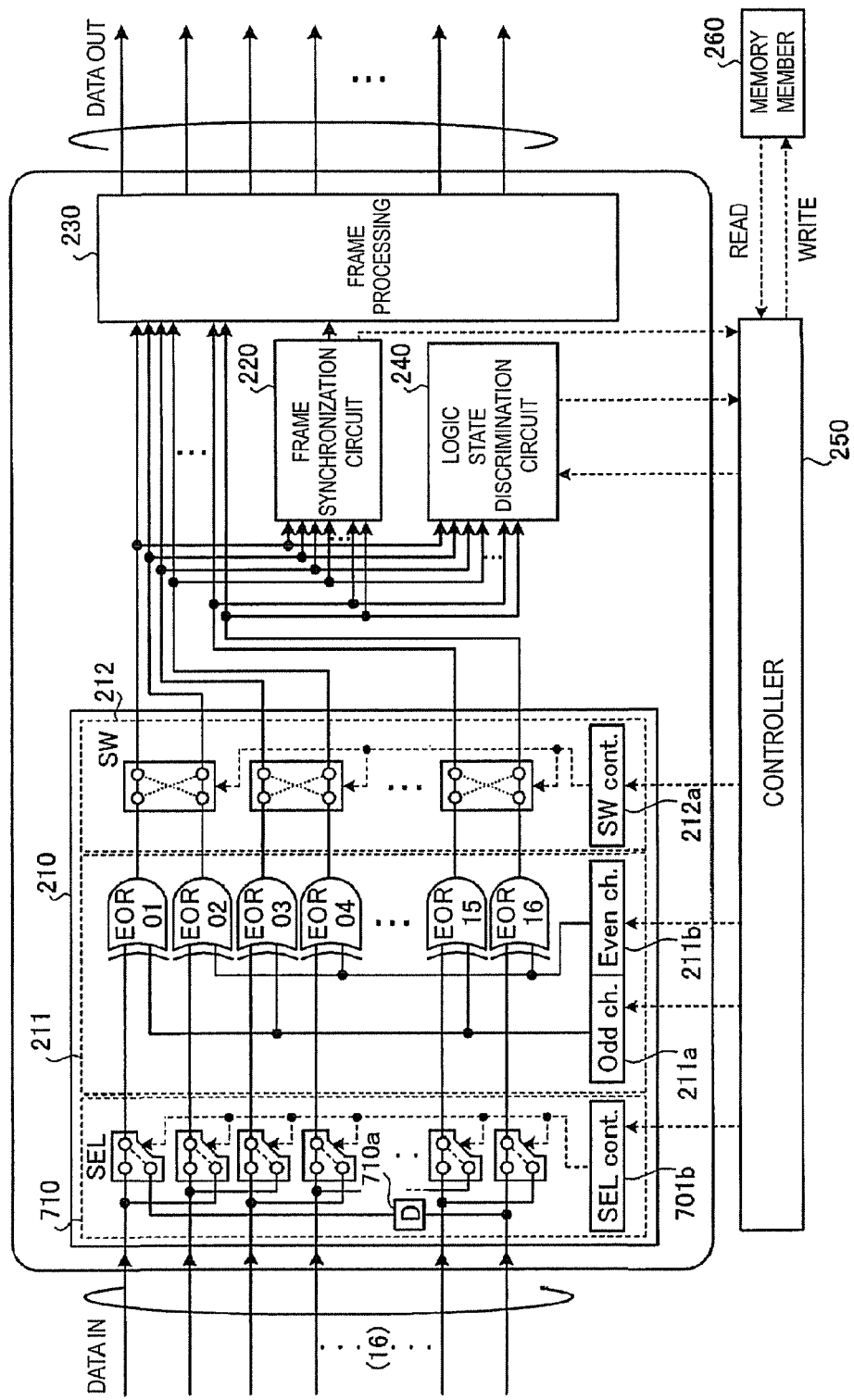
FIG. 7 is a flow chart illustrating an example of the structure of the frame processor of the optical receiver according to embodiment 2.

FIG. 7 is a block diagram illustrating an example of the structure of the frame processor of the optical receiver according to embodiment 2. Within FIG. 7, structures shown in FIG. 2 and similar structures are assigned the same item codes, and explanation of such items will be omitted. As shown in FIG. 7, the logic controller 210 of the optical receiver 100 of embodiment 2 is equipped with a 1-bit delay circuit 710.

Using the 1-bit delay circuit 710, the controller 250 causes a 1-bit delay of the parallel data (data in) output from the parallel converter 140 to the logic inversion circuit 211. The 1-bit delay circuit 710 is equipped with 16 selectors (SEL) corresponding to respective 16 parallel data output from the parallel converter 140, a 1-bit delay member 710a (D), and a selector controller 710b (SEL controller).

When the setting value of the selector controller 710b changes from "0" to "1", the paths of the 16 selectors are switched as indicated by the dashed lines of the figure, and the 1st datum, 2nd datum, . . . , and 15th datum are output as the 2nd datum, 3rd datum, . . . , and 16th datum, respectively. The 16th datum is delayed by 1-bit by the 1-bit delay member 710a and is output as the 1st datum.

FIG. 8 is a diagram illustrating an example of logic state of the electrical signal output from the parallel converter. Within FIG. 8, explanation will be omitted for components which are shown in FIG. 3 or which are similar. Within FIG. 8, table 810 is a table of logic states of the parallel signal when parallel data from the parallel converter 140 are output without delay by 1-bit. Table 820 is a table of logic states of the parallel signal when parallel data from the parallel converter 140 are output delayed by 1-bit.

The horizontal axis items of table 810 and table 820 (odd channel) are odd numbered data output from the parallel converter 140 and indicate any of the normal rotation Qk signal, the inverse Qk signal, the reverse Ik signal, and the normal rotation Ik signal. The items plotted along the vertical direction of table 810 and table 820 (even channel) are even numbered data output from the parallel converter 140 and indicate any of the normal rotation Qk signal, the inverse Qk signal, the reverse Ik signal, and the normal rotation Ik signal.

In this manner, when the parallel data output from the parallel converter 140 is delayed by 1-bit, logic states of the parallel data output from the parallel converter 140 become the 32 types indicated in table 810 and table 820. The controller 250 and the logic state decision circuit 240 distinguish the logic state among the 32 types of table 810 and table 820 from among the logic states of parallel data output from the parallel converter 140

FIG. 9 is a drawing illustrating an example of the pattern table provided for the optical receiver according to embodiment 2. Within FIG. 9, explanation of items shown in FIG. 4 or similar items are omitted. Column nos. 3-7 indicate setting values of logic state control associated with each comparison pattern in the case of a lack of 1-bit delay (delay state (1)) of parallel data output from the parallel converter 140.

Column nos. 8-12 indicate setting values of logic state control associated with each comparison pattern in the case of 1-bit delay (delay state (2)) of parallel data output from the parallel converter 140. The no. 3 column (1D) shows the setting value of the selector controller 710b of the 1-bit delay circuit 710 in the case of delay state (1). The no. 8 column indicates the setting value of the selector controller 710b of the 1-bit delay circuit 710 in the case of delay state (2).

For example, in the case of a match between the frame synchronization bit and the comparison pattern 3 (P=3) and delay state (1), a setting change is required from setting values of "0" to "1" for the even channel setting member 211b of the logic inversion circuit 211 and the switch controller 212a of the bit swap circuit 212.

However, in the case of a match of the frame synchronization bit for the comparison pattern 3 (P=3) and delay state (2), a setting change is required from setting values of "0" to "1" for the selector controller 710b of the 1-bit delay circuit 710, the even channel setting member 211b of the logic inversion circuit 211, and the switch controller 212a of the bit swap circuit 212.

Figure 10:
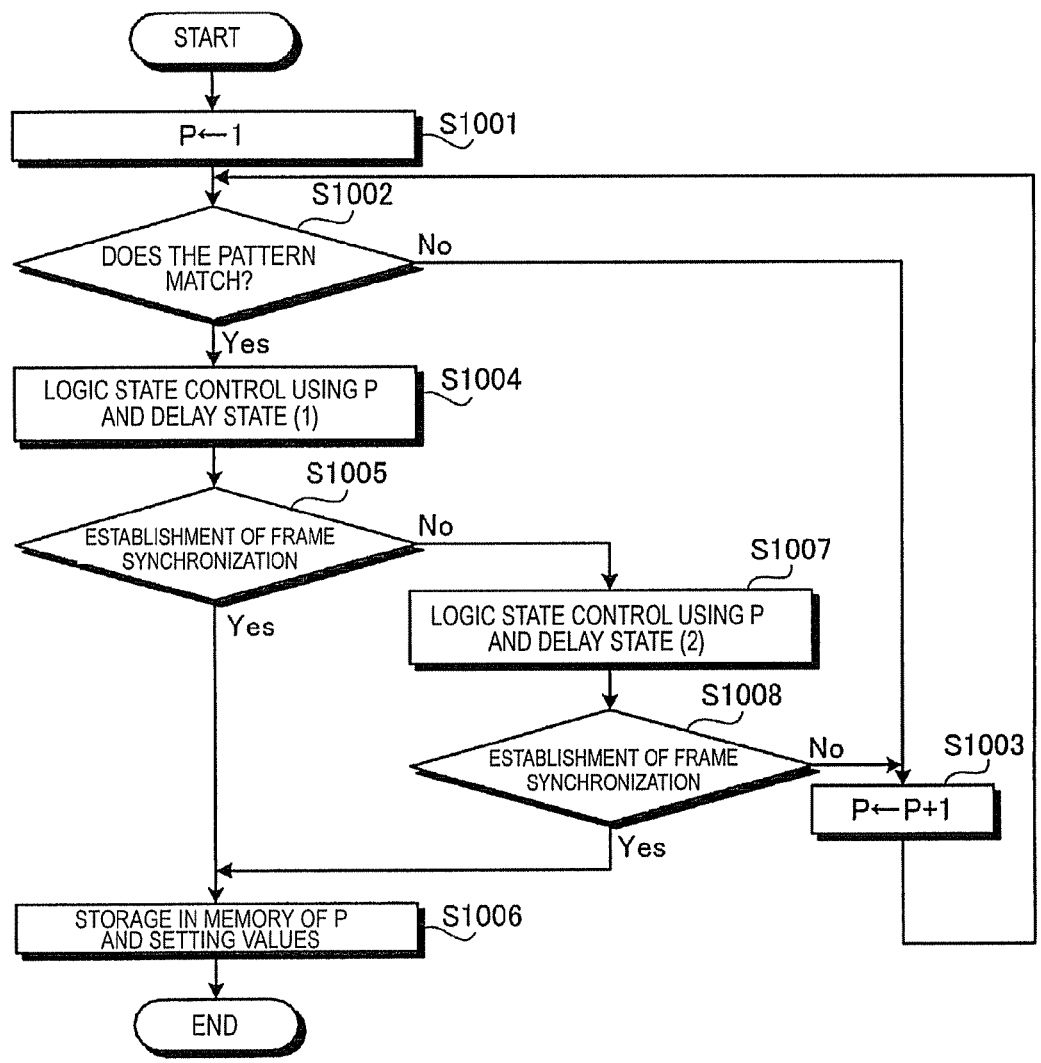
FIG. 10 is a flow chart illustrating an example of the initialization operation of the optical receiver according to embodiment 2.

FIG. 10 is a flow chart illustrating an example of the initialization operation of the optical receiver according to embodiment 2. As shown in FIG. 10, the controller 250 firstly resets logic state control using the logic inversion circuit 211, the bit swap circuit 211, and the 1-bit delay circuit 710 and sets the comparison pattern P output to the logic state decision circuit 240 to 1 (step S1001). Thereafter, the logic state decision circuit 240 judges whether or not there is a match between the frame synchronization bit included in the parallel data output from the logic controller 210 and the comparison pattern P output from the controller 250 (step S1002).

When there is not a match between the frame synchronization bit and the comparison pattern P during step S1002 (step S1002 result=No), the controller 250 sets the comparison pattern P output to the logic state decision circuit 240 to P+1 (step S1003). During step S1003 when the comparison pattern P exceeds P=16, which is the maximum item number value shown in FIG. 9, the setting becomes P=1. Thereafter, processing returns to step S 1002 and continues.

When the frame synchronization bit and the comparison pattern P match during step S1002 (step S1002 result=Yes), the controller 250 performs control of logic state based on the setting value corresponding to the delay state (1) (see FIG. 9) of the comparison pattern P (step S1004). Thereafter, the frame synchronization circuit 220 judges whether or not frame synchronization is established for the parallel data output from the logic controller 210 (step S1005).

When frame synchronization is established during step S1005 (step S1005 result=Yes), the controller 250 causes storage of the comparison pattern P and the logic state control values in the memory member 260 (step S1006) and ends the series of initialization operations. When frame synchronization is not established (step S1005 result=No), the controller 250 performs control of logic state based on the setting values corresponding to delay state (2) of the comparison pattern P (step S1007).

Thereafter, the frame synchronization circuit 220 judges whether or not frame synchronization is established for the parallel data output from the logic controller 210 (step S1008). When frame synchronization is not established (step S1008 result=No), after a partial reset (step S1009) of the logic state control set during the above mentioned step S1007, processing proceeds to step S1003 and continues. When frame synchronization is established (step S1008 result=Yes), processing proceeds to step S1006 and continues.

Figure 11:
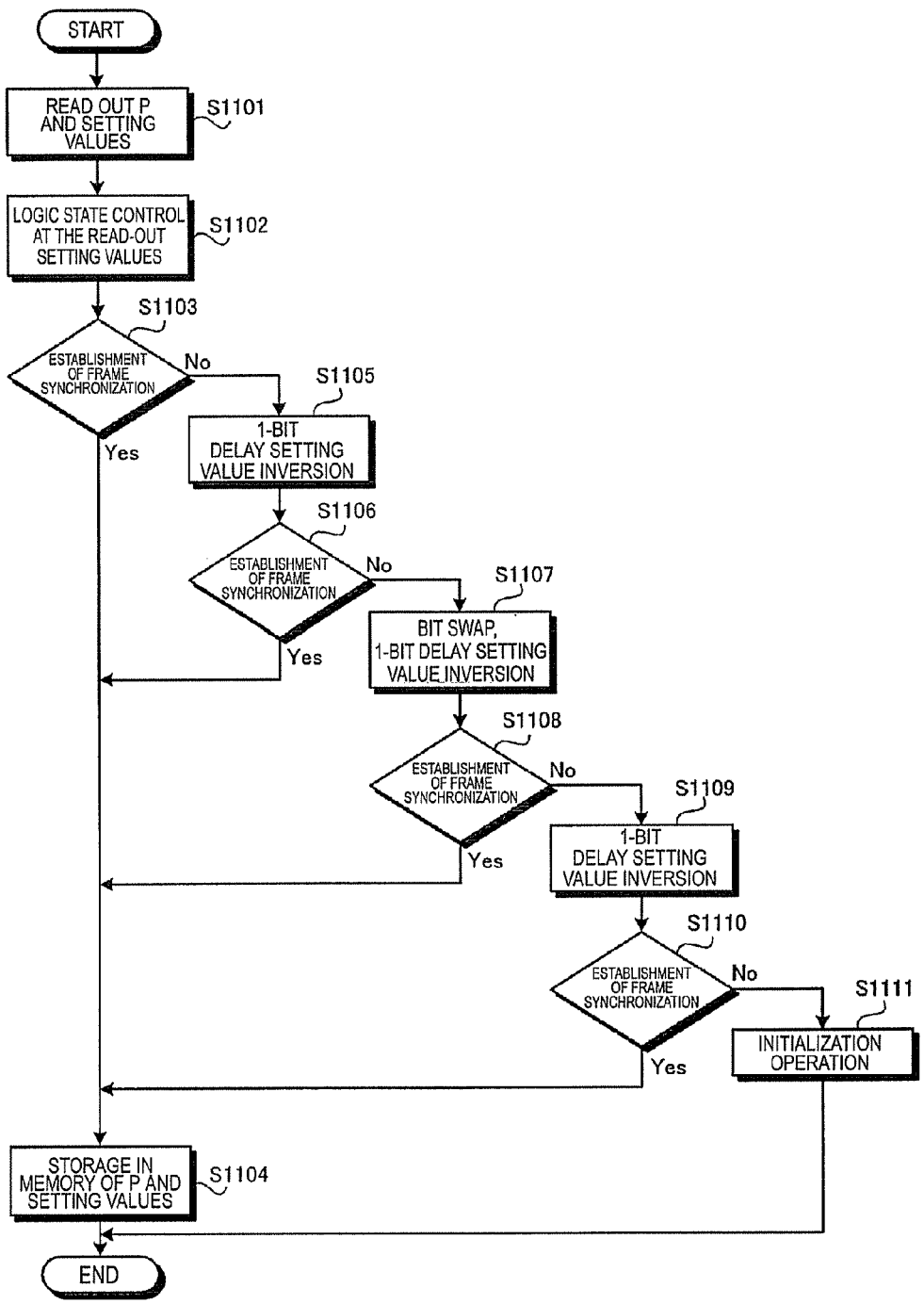
FIG. 11 is a flow chart illustrating an example of the recovery operation after a fault of the optical receiver according to embodiment 2.

FIG. 11 is a flow chart illustrating an example of the recovery operation after a fault of the optical receiver according to embodiment 2. When frame synchronization is lost according to the frame synchronization circuit 220 due to a system fault and the like, firstly, as shown in FIG. 11, the controller 250 reads out the comparison pattern P and the logic state control setting values stored by the memory member 260 (step S1101).

Thereafter, based on the setting value of logic state control read out during step S1101, the controller 250 performs control of the logic state (step S1102). Thereafter, the frame synchronization circuit 220 judges whether of not frame synchronization is established for the parallel data output from the logic controller 210 (step S1103).

When frame synchronization is established during step S1103 (step S1103 result Yes), the controller 250 causes storage of the comparison pattern P and the logic state control values in the memory member 260 (step S1104) and ends the series of recovery operations. When frame synchronization is not established (step S1103 result=No), the controller 250 causes inversion of the setting values of the selector controller 710*b* of the 1-bit delay circuit 710 (step S1105).

Thereafter, the frame synchronization circuit 220 judges whether or not frame synchronization is established for parallel data output from the logic controller 210 (step SI 106). When frame synchronization is established (step S1106 result=Yes), processing proceeds to step S1104 and continues.

When frame synchronization is not established during step S1106 (step S1106 result=No), the controller 250 causes an inversion of the setting values of the switch controller 212*a* of the bit swap circuit 212 and the selector controller 710*b* of the 1-bit delay circuit 710 (step S1107). That is to say, the resultant state is that of step S1102 after inversion of the setting values of only the bit swap circuit 212.

Thereafter, the frame synchronization circuit 220 judges whether or not frame synchronization is established for parallel data output from the logic controller 210 (step S1108). When frame synchronization is established (step S1108 result=Yes), processing proceeds to step S1104 and continues.

When frame synchronization is not established during step S1108 (step S1108 result=No), the controller 250 causes inversion of the setting values of the selector controller 710*b* of the 1-bit delay circuit 710. That is to say, the resultant state is that of step S1102 after inversion of the setting values of the bit swap circuit 212 and the 1-bit delay circuit 710.

Thereafter, the frame synchronization circuit 220 judges whether or not frame synchronization is established for parallel data output from the logic controller 210 (step S1110). When frame synchronization is established (step S1110 result=Yes), processing proceeds to step S1104 and continues. When frame synchronization is not established (step S1110 result=No), the initialization operations (see FIG. 10) are performed again (step S1111), and the series of recovery operations is ended.

Since the control values of phase shifts of the delay interferometer 112*a* and the delay interferometer 112*b* are maintained even when a system fault is generated, the setting values read out from the memory member 260 become appropriate setting values for the logic inversion circuit 211. Therefore, due to appropriate setting of the logic inversion circuit 211 during step S1102, the combination of setting values of the 1-bit delay circuit 710 and the bit swap circuit 212 is changed.

Here setting values are changed, in order, for the 1-bit delay circuit 710 (step S1105), the bit swap circuit 212 (step S1107), the 1-bit delay circuit 710, and the bit swap circuit 212 (step S1109). However, the order of setting of these setting values is not limited to this case.

When processing proceeds to step S1111, since the setting values of logic state used during step S1102, step S1105, and step S1109 were found to be inappropriate during step S1103, step S1106, and step S1110, respectively, it is possible to limit the comparison patterns P during step S1111.

For example, when the comparison pattern P corresponding to the setting value during step S1102 was delay state (1) of 3, the comparison pattern P corresponding to the setting value during step S1105 becomes delay state (2) of 3. The comparison pattern P corresponding to the setting value during the step S1107 also becomes delay state (1) of 14. The comparison pattern P corresponding to the setting value during the step S109 also becomes delay state (2) of 14.

For this reason, during step S1111, as targets of comparison it is permissible to eliminate from the comparison patterns P the delay state (1) of 3, the delay state (2) of 3, the delay state (1) of 14, and the delay state (2) of 14. By this means, the time interval until establishment of frame synchronization by step S1111 can be shortened.

Moreover, it is also permissible to lower the order of priority of these comparison patterns rather than to eliminate these comparison patterns as targets of comparison. By this means, while shortening the time interval until establishment of frame synchronization, it is possible to perform appropriate control of logic state even when the phase shifts of the delay interferometer 112*a* and the delay interferometer 112*b* have changed.

In this manner, according to the optical receiver 100 of embodiment 2, in addition to having the effect of the above mentioned optical receiver 100 of embodiment 1, even when a 1-bit delay of the parallel data is generated due to clock phase relationships of the regenerator-multiplexer 130 and the parallel converter 140, it is possible to control the parallel data at the desired logic state by performance of 1-bit delay processing by the 1-bit delay circuit 710.

Embodiment 3

Figure 12:
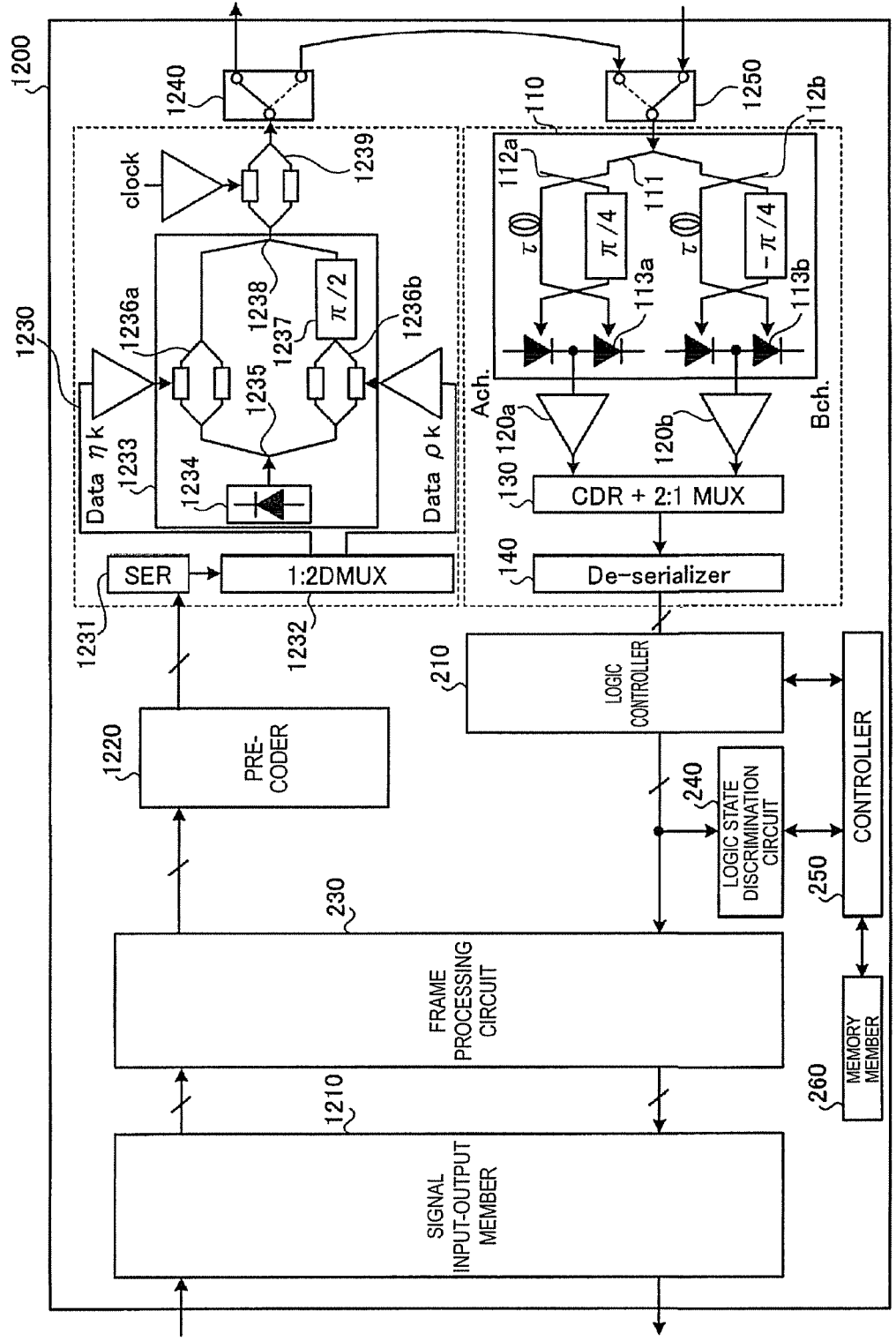
FIG. 12 is a block diagram illustrating an example of the structure of the optical communication device according to embodiment 3.

FIG. 12 is a block diagram illustrating an example of the structure of the optical communication device according to embodiment 3. Within FIG. 12, structures shown in FIG. 1 and FIG. 2 and similar structures are assigned the same item codes, and explanation of such items will be omitted. The optical communication device 1200 is an optical communication device which receives an optical signal modulated by the DQPSK format at, for example, 43 Gb/s and transmits an optical signal modulated by the DQPSK format at 43 Gb/s.

As shown in FIG. 12, the optical communication device 1200 of embodiment 3, in addition to the structure of the optical communication devices 100 of embodiments 1 and 2, is equipped with a signal input-output member 1210, a precoder 1220, an optical transmission member 1230, an optical switch 1240, and an optical switch 1250.

The frame processing circuit 230 outputs frame-processed parallel data to the signal input-output member 1210. The frame processing circuit 230 also performs storage mapping processing for the frame of OTN, SDH/SONET, and the like for wavelength division multiplexing (WDM) of data output from the signal input-output member 1210. The data having undergone mapping processing is output by the frame processing circuit 230 to the precoder 1220.

The signal input-output member 1210 outputs to the client side the parallel data output from the frame processing circuit 230. The signal input-output member 1210 also outputs to the frame processing circuit 230 the 2.7 Gb/s×16 parallel data output from the client side. The precoder 1220 encodes the parallel data output from the frame processing circuit 230 using logic as prescribed by DQPSK format modulation and then outputs the encoded data to the optical transmission member 1230.

The optical transmission member 1230 is equipped with a serializer 1231 (SER), a demultiplexer 1232 (1:2 DMUX), a phase modulator 1233, and an intensity modulator 1239. The serializer 1231 performs parallel-to-serial conversion of the 2.7 Gb/s×16 parallel data output from the precoder 1220 to form 43 Gb/s serial data which are output to the demultiplexer 1232. Although the case of 2.7 Gb/s×16 parallel data is indicated here, no limitation is placed on the parallel data count of the parallel data.

The demultiplexer 1232 performs demultiplexing of the 43 Gb/s serial data output from the serializer 1231 to produce a 21.5 Gb/s signal $\eta k$ and a 21.5 Gb/s signal $\rho k$. The demultiplexer 1232 outputs the 21.5 Gb/s signal $\eta k$ and the 21.5 Gb/s signal $\rho k$ to the phase modulator 1233 (data $\eta k$ and data $\rho k$).

The phase modulator 1233 is equipped with a light source 1234, a branch part 1235, a phase modulator 1236a, a phase modulator 1236b, a π/2 phase shifter 1237, and a coupler 1238. The light source 1234 outputs continuous light to the branch part 1235. The branch part 1235 splits the continuous light output from the light source 1234 and outputs the split light to the phase modulator 1236a and the phase modulator 1236b.

The phase modulator 1236a performs phase modulation of the continuous light output from the branch part 1235 based on the signal ηk output from the demultiplexer 1232 and outputs this to the coupler 1238. The phase modulator 1236b performs phase modulation of the continuous light output from the branch part 1235 based on the signal ρk output from the demultiplexer 1232 and outputs this to the π/2 phase shifter 1237.

The phase modulator 1236a and the phase modulator 1236b, for example, are Mach-Zehnder type interferometers. The π/2 phase shifter 1237 phase shifts the optical signal output from the phase modulator 1236b by just π/2 or −π/2 and sends output to the coupler 1238. The coupler 1238 couples the optical signal output from the phase modulator 1236a and the optical signal output from the π/2 phase shifter 1237 and sends output to the intensity modulator 1239.

The intensity modulator 1239 performs intensity modulation of the optical signal output from the phase modulator 1233 to convert to an IM optical signal and outputs this to the optical switch 1240. The intensity modulator 1239, for example, is a Mach-Zehnder type interferometer. The intensity modulator 1239 performs intensity modulation using a 21.5 GHz clock.

The optical switch 1240 performs path switching of the optical signal output from the intensity modulator 1239 of the optical transmission member 1230. Specifically, the optical switch 1240 performs switching between a no. 1 path (dashed line in the figure) for outputting the optical signal output from the intensity modulator 1239 to the optical switch 1250 and a no. 2 path (solid line in the figure) for transmitting an optical signal output from the intensity modulator 1239 to another communication device. This optical switch 1240 may be replaced by a 1-input/2-output optical coupler.

The optical switch 1250 performs path switching of the optical signal output to the branch part 111 of the optical receiver 100. Specifically, the optical switch 1250 performs switching between a no. 1 path (dashed line in the figure) for outputting the optical signal output from the optical switch 1240 to the branch part 111 of the optical receiver 100 and a no. 2 path (solid line in the figure) for output of the optical signal transmitted from the other communication device to the branch part 111 of the optical receiver 100.

By the optical communication device 1200, according to this structure, switching both the optical switch 1240 and the optical switch 1250 to the no. 1 path, the optical signal modulated by the optical transmission member 1230 is output to the branch part 111 of the optical receiver 100. Also, by the optical communication device 1200 switching both the optical switch 1240 and the optical switch 1250 to the no. 2 path, the modulated optical signal is sent to the other communication device and the optical signal sent from the other communication device is received.

By this means, the controller 250 resets logic state control, switches both the optical switch 1240 and the optical switch 1250 to the no. 1 path, and inputs and demodulates the optical signal modulated and output by the device itself. Thus, performance of control of the logic controller 210 is possible even when an optical signal is not transmitted from the other optical communication device.

The logic inversion state of the optical signal output to the frame processor 150 is determined by the setting values of the phase shifts of the delay interferometer 112a and the delay interferometer 112b of the device itself. Thus, the logic inversion state of the optical signal determined prior to reception of the optical signal from the other communication device is not changed even after reception of the optical signal from the other communication device.

The controller 250 predetermines the logic inversion state prior to reception of the optical signal from the other communication device. Also, for decision of logic state of the optical signal while receiving the optical signal from the other optical communication device, the controller 250 eliminates comparison patterns for change of setting values of the logic inversion circuit 211 as targets of comparison. By this means, the time interval up until decision of logic state and establishment of frame synchronization can be shortened.

Furthermore, although the means for output of the optical signal output from the optical switch 1240 to the branch part 111 of the optical receiver 100 was explained as having a structure utilizing the optical switch 1240 and the optical switch 1250, a structure is also permissible which uses branch components such as optical couplers and the like rather than the optical switch 1240 and the optical switch 1250.

In this manner, in addition to the effects of the optical receivers 100 according to the various above mentioned embodiments, the optical communication device 1200 according to embodiment 3 is able to perform control of the logic controller 210 even when an optical signal is not transmitted from the other optical communication device. For this reason, the time interval for establishment of frame synchronization can be shortened while receiving the optical signal from the other communication device. Thus, the time interval until recovery after a fault can be shorted when a fault is generated.

Embodiment 4

FIG. 13 is a block diagram illustrating an example of the structure of the optical communication system according to embodiment 4. Within FIG. 13, structures shown in FIG. 12 and similar structures are assigned the same item codes, and explanation of such items will be omitted. As shown in FIG. 13, the optical communication system 1300 of embodiment 4 comprises two opposing optical communication devices 1310 and a transmission path 1320.

The two opposing optical communication devices 1310, in addition to the structure of the optical communication device 1200 according to embodiment 3, further each comprise an SV signal transmitter 13 11, a multiplexer 1312, a demultiplexer 1313, and an SV signal receiver 1314. The optical communication device 1200 outputs to the multiplexer 1312 the transmitted optical signal (referred to hereinafter as the "data optical signal"). The optical communication device 1200 also receives the data optical signal output from the demultiplexer 1313.

The SV signal transmitter 1311 converts information of the decision result stored in the memory member 260 into an SV (SuperVisory) optical signal and outputs this to the multiplexer 1312. The multiplexer 1312 performs multiplexing of the data optical signal output from the optical communication device 1200 and the SV optical signal output from the SV signal transmitter 1311. The multiplexer 1312 transmits the multiplexed optical signal through the transmission path 1320 to the opposing optical communication device 1310.

The demultiplexer 1313 performs demultiplexing of the optical signal transmitted from the opposing optical communication device 1310 into the data optical signal and the SV optical signal. The demultiplexer 1313 outputs the demultiplexed data optical signal to the optical communication device 1200 and outputs the demultiplexed SV optical signal to the SV signal receiver 1314. The SV signal receiver 1314 converts the SV optical signal output from the demultiplexer 1313 into information of the decision result and stores this in the memory member 260.

According to this structure, the optical communication device 1310 is capable of acquiring information of the logic state discriminated by the opposing optical communication device 1310. The bit swap state of the optical signal output to the frame processor 150 is determined by the setting value of the phase shift of the $\pi/2$ phase shifter 1237 of the opposing optical communication device 1310. The controller 250, among the information of the logic state acquired from the opposing optical communication device 1310, performs setting of the bit swap circuit 212 using the bit swap state information.

Then the controller 250, while receiving the optical signal from the opposing optical communication device 1310 and when discriminating logic state of the optical signal, eliminates from the targets of comparison the comparison pattern for revision for the setting value of the bit swap circuit 212. By this means, the time interval up until decision of logic state and establishment of frame synchronization can be shortened.

The SV signal transmitter 1311 may have a structure for transmission of, among the information of the decision result stored in the memory member 260, only the decision result of the bit swap state to the opposing optical communication device 1310. The amount of communication of the SV optical signal can be decreased by this means. The SV signal transmitter 1311 may also have a structure which transmits information of the logic state associated with the decision result rather than a structure which transmits the decision result information.

It is also permissible, among the two optical communication devices 1310, for just a first optical communication device 1310 to be equipped with the SV signal transmitter 1311 and for the other optical communication device 1310 alone to be equipped with the SV signal receiver 1314. Also in this case, the optical communication device 1310 equipped with the SV signal receiver 1314 can receive the SV optical signal from the optical communication device 1310 equipped with the SV signal transmitter 1311 and then can perform control of logic state based on the received logic state information.

FIG. 14 is a drawing illustrating an example of the pattern table provided for the optical communication system according to embodiment 4. Within FIG. 14, items shown in FIG. 9 and similar items are assigned the same item codes, and explanation of such items will be omitted. The optical communication device 1310 according to embodiment 4 is equipped with a pattern table as indicated in FIG. 14. The 13th column (transmission side, phase modulator) indicates the setting values for the phase shift associated with each comparison pattern for the $\pi/2$ phase shifter 1237 (see FIG. 12) of the phase modulator 1233 of the optical transmission member 1230.

The 14th column (reception side, A-arm) indicates the setting values of phase shift associated with each comparison pattern for the delay interferometer 112a (see FIG. 1) of the optical receiver 100. The 15th column (reception side, B-arm) indicates the setting values of phase shift associated with each comparison pattern for the delay interferometer 112b (see FIG. 1) of the optical receiver 100.

For example, when the frame synchronization bit matches comparison pattern 3 (P=3), the controller 250 sets to "1" the setting values of the even channel setting member 211b of the logic inversion circuit 211 and the switch controller 212a of the bit swap circuit 212. In addition, the SV signal transmitter 1311 transmits to the opposing optical communication device 1310 the fact that the setting value of the phase shifter 1237 of the device itself has become $+\pi/2$.

Figure 15:
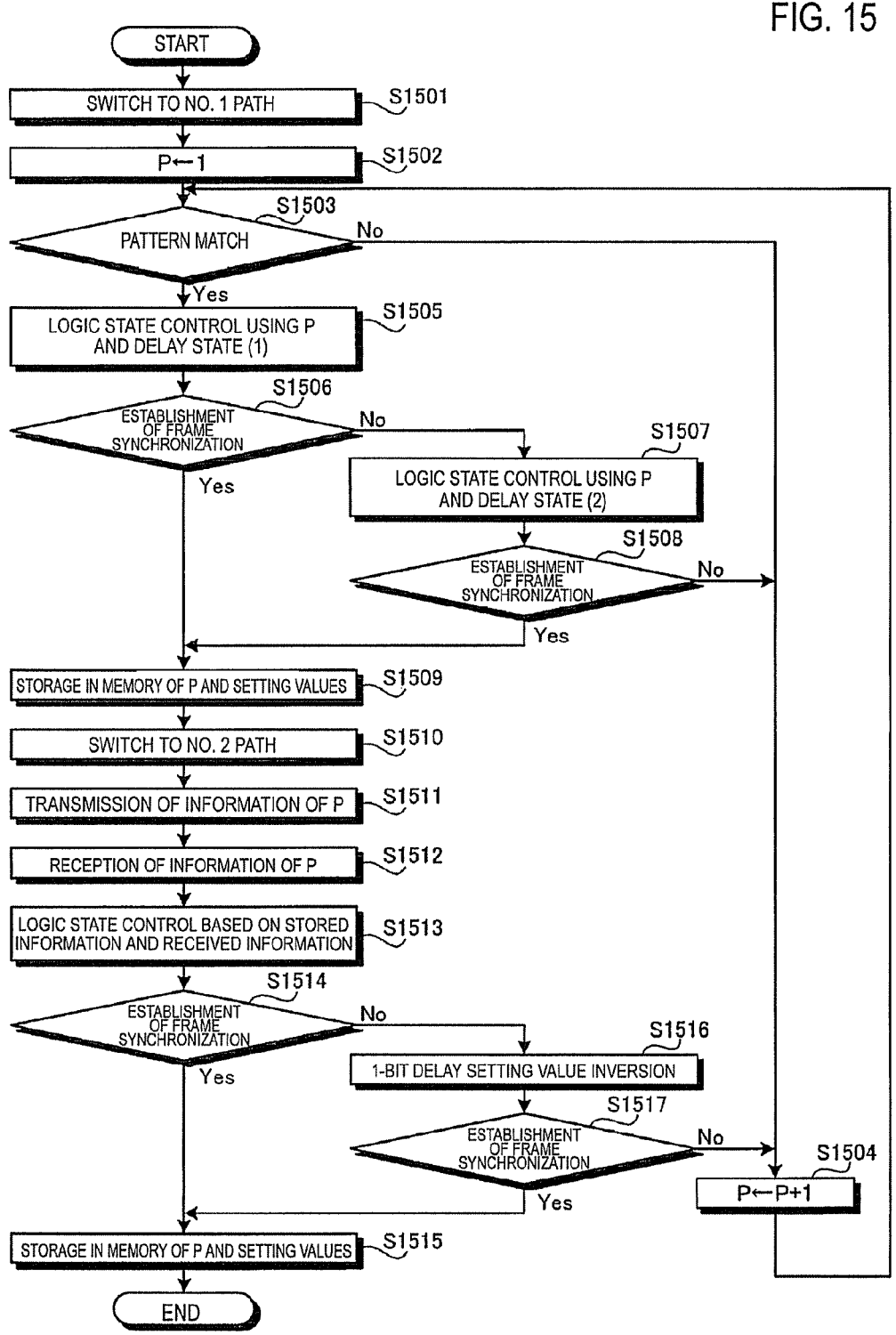
FIG. 15 is a flow chart illustrating an example of operation of the optical communication device according to embodiment 4.

FIG. 15 is a flow chart illustrating one example of operation of the optical communication device according to embodiment 4. As shown in FIG. 15, switching of the optical switch 1240 and the optical switch 1250 is performed to switch the optical signal output from the optical transmission member 1230 to the no. 1 path (see FIG. 12) which outputs to the branch part 111 of the optical receiver 100 (step S1501).

Thereafter, the controller 250 resets logic state control using the logic inversion circuit 211, the bit swap circuit 212, and the 1-bit delay circuit 710 and sets the comparison pattern P output to the logic state decision circuit 240 to 1 (step S1502). Thereafter, the logic state decision circuit 240 judges whether or not there is a match between the comparison pattern P output from the controller 250 and the frame synchronization bit included in the parallel data output from the logic controller 210 (step S1503).

If the frame synchronization bit and the comparison pattern P did not match during step S1503 (step S1503 result=No), then the controller 250 sets the comparison pattern P output to the logic state decision circuit 240 to P+1 (step S1504). When the comparison pattern P during this step S1504 exceeds the maximum value of P=16 shown in FIG. 14, then a setting of P=1 is used. Thereafter, processing continues by jumping to step S1503.

If the frame synchronization bit and the comparison pattern P matched during step S1503 (step S1503 result=Yes), then the controller 250 performs control of logic state based on the setting values (see FIG. 14) corresponding to a delay state (1) of the comparison pattern P (step S1505). Thereafter, the frame synchronization circuit 220 judges whether or not frame synchronization has been established for parallel data output from the logic controller 210 (step S1506).

When frame synchronization is not established during step S1506 (step S1506 result=No), the controller 250 performs control of logic state based on the setting values corresponding to a delay state (2) of the comparison pattern P (step S1507). Thereafter, the frame synchronization circuit 220 judges whether or not frame synchronization has been established for parallel data output from the logic controller 210 (step S1508).

When frame synchronization is not established during step S1508 (step S1508 result=No), after a partial reset (step S1518) of the logic state control set during the above mentioned step S1507, processing continues by jumping to step S1504. When frame synchronization is established during step S1506 (step S1506 result=Yes) and frame synchronization is established during step S1508 (step S1508 result=Yes), the controller 250 causes storage of the comparison pattern P and the logic state control setting values in the memory member 260 (step S1509).

Thereafter, the optical switch 1240 and optical switch 1250 perform switching to the no. 2 path (see FIG. 12) to send to the opposing optical communication device 1310 the optical signal output from the optical transmission member 1230 and to send the optical signal sent from the opposing optical communication device 1310 to the branch part 111 of the optical receiver 100 (step S1510).

Thereafter, the SV signal transmitter 1311 sends (step S1511) to the opposing optical communication device 1310 the information of the comparison pattern P (see FIG. 14) stored due to step S1509. Thereafter, the SV signal receiver 1314 receives from the opposing optical communication device 1310 the information of the comparison pattern P discriminated by the opposing optical communication device 1310 (step S1512).

Thereafter, the controller 250 performs control of logic state (step S1513) based on the setting values of the phase shifts of the delay interferometer 112a and the delay interferometer 112b associated with the comparison pattern P (stored information) stored by the memory member 260 due to step S1509 and based on the setting value of phase shift of the π/2 phase shifter 1237 associated the comparison pattern P (received information) received from the opposing optical communication device 1310 due to signal reception of step S1512.

Thereafter, the frame synchronization circuit 220 judges whether or not frame synchronization is established for the parallel data output from the logic controller 210 (step S1514). When frame synchronization is established (step S1514 result=Yes), the controller 250 causes the comparison pattern P and the logic state control setting values to be stored by the memory member 260 (step S1515), and the series of operations ends.

If frame synchronization is not established during step S1514 (step S1514 result=No), the controller 250 causes inversion of the setting value of the selector controller 710b of the 1-bit delay circuit 710 (step S1516). Thereafter, the frame synchronization circuit 220 judges whether or not frame synchronization has been established for parallel data output from the logic controller 210 (step S1517).

If frame synchronization is not established during step S1517 (step S1517 result=No), after partial reset (step S1519) of the logic state control set during the above mentioned step S1513, processing continues by jumping to step S1504. If frame synchronization is established during step S1517 (step S1517 result=Yes), the processing continues by jumping to step S1515.

In this manner, according to the optical communication system 1300 of embodiment 4, in addition to having the effects of the optical receiver 100 and the optical communication device 1200 of the various above mentioned embodiments, the optical communication device 1310 is capable of performing control of logic state by use of information of logic state received from the opposing optical communication device 1310. This made possible the reduction of the time interval until establishment of frame synchronization while receiving an optical signal from the opposing optical communication device 1310. Thus, the time interval for recovery after a fault can be reduced when a fault is generated.

As explained previously, according to the optical receiver, the optical communication device, and the optical signal receiving method of these embodiments, when a fault is generated, control of logic state is performed using previously stored information of the logic state. Thus, the time interval until establishment of frame synchronization can be shortened. Also, changes are made while prioritizing the setting of the bit swap circuit 212 or the 1-bit delay circuit 710, and thus the time interval until establishment of frame synchronization can be shortened. Also, although embodiments of the differential quadrature phase shift method were explained, application to the above mentioned embodiments is also possible of known technologies such as the differential 8-part phase shift method, the differential 16-part phase shift method, and the like.

Also, for repeated decision of the logic state of the electrical signal when a fault is generated, the logic state can be discriminated efficiently by restriction of comparison patterns and then decision of the logic state, and the time interval until establishment of frame synchronization can be reduced. For this reason, when a fault is generated, the time interval until recovery after the fault can be shortened.

Furthermore, the optical receiver, the optical communication device, and the optical signal receiving method of these embodiments can be used for re-establishment of frame synchronization when frame synchronization is lost due to an intentional input interruption of the optical signal and the like rather than simply due to generation of a fault.

According to the above mentioned structure, the logic controller can control the logic state of the electrical signal using the logic state identification result stored in memory by the memory member.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An optical receiver comprising:
a demodulator converting an in-phase signal of a received differential phase modulated optical signal to a first electrical signal and converting a quadrature signal of the received differential phase modulated optical signal to a second electrical signal;
a decision member deciding logic states of the first and second electrical signals;
a logic controller using a decision result of the decision member to control the logic states of the first and second electrical signals; and
a memory member storing information relating to the decision result of the decision member,
wherein the logic controller controls the logic states using the information relating to the decision result stored by the memory member,
the optical receiver further comprises a synchronization member establishing frame synchronization of the first and second electrical signals for which logic states were controlled by the logic controller; and
the memory member stores information relating to the decision result when frame synchronization is established by the synchronization member.

2. The optical receiver according to claim 1:
wherein, when frame synchronization by the synchronization member has been lost, the logic controller changes the logic states using information relating to the decision result.

3. The optical receiver according to claim 1 wherein the logic controller comprises:
a logic inversion circuit performing logic inversion of the first and second electrical signals,
a bit swap circuit performing bit swapping of the first and second electrical signals, and
a controller controlling the logic inversion circuit and the bit swap circuit; and
if frame synchronization is not established after control of the logic states using information relating to the decision result stored by the memory member, the controller changes priority of the setting of the bit swap circuit.

4. The optical receiver according to claim 3, wherein when the frame synchronization is not established after the priority revision, the decision member re-discriminates the logic states of the first and second electrical signals; and the logic controller changes the logic states using the re-decision result of the decision member.

5. The optical receiver according to claim 1, wherein the logic controller comprises:
a logic inversion circuit performing logic inversion of the first and second electrical signals,
a bit swap circuit performing bit swapping of the first and second electrical signals,
a 1-bit delay circuit performing a 1-bit delay of the first and second electrical signals, and
a controller controlling the logic inversion circuit and the bit swap circuit; and
if frame synchronization is not established after control of the logic states using information relating to the decision result stored by the memory member, the controller changes priority of the setting of the bit swap circuit and/or the 1-bit delay circuit.

6. The optical receiver according to claim 1, wherein the decision member performs decision of a pattern of the logic states based on a frame synchronization bit included in the first and second electrical signals.

7. The optical receiver according to claim 6, wherein
the optical receiver further comprises a table of patterns associating each pattern of the logic states with a corresponding setting value of control of the logic states; and
the logic controller controls the logic states using the corresponding setting value of the pattern table for a pattern of the logic states discriminated by the decision member.

8. The optical receiver according to claim 1, wherein the optical receiver further comprises:
an optical transmission device for transmission of an optical signal modulated by a differential phase modulation method using a pair of phase modulators and one π/2 phase shifter; and
an input-output member for receiving the optical signal modulated by the optical transmission device and for output to the optical receiver.

9. The optical receiver according to claim 8, wherein the input-output member is an optical switch for switching between a first path for input and output of the signal modulated by the optical transmission device with respect to the optical receiver, and a second path for transmission of the signal modulated by the optical transmission device to another optical communication device.

10. The optical receiver according to claim 8, wherein optical receiver further comprises a transmission member for transmission of information relating to the decision result of the decision member with respect to the optical signal output by the input-output member.

11. The optical receiver according to claim 10, wherein
the optical receiver further comprises a pattern table associating the decision result with a corresponding state of the π/2 phase shifter of the optical transmission device; and
the transmission member transmits information of the state of the π/2 phase shifter of the optical transmission device as information relating to the decision result.

12. The optical receiver according to claim 8, further comprising:
a signal reception member receiving information relating to the decision result transmitted from the optical communication device; and
the logic controller controls the logic state using the information relating to the decision state received by the signal reception member.

13. An optical signal reception method for demodulation of a received optical signal modulated by a differential phase modulation method comprising:
demodulating an in-phase signal of the received optical signal by a delay interferometer to convert to first and second electrical signals, and demodulating a quadrature signal of the received optical signal by an optical-electric conversion element to convert to another electrical signal;
discriminating logic states of the first and second electrical signals, to thereby provide a decision result;
controlling the logic states of the first and second electrical signals using the decision result;
storing information relating to the decision result; and
further controlling the logic states using the stored information,
wherein the optical receiver further comprises a synchronization member establishing frame synchronization of the first and second electrical signals for which logic states were controlled by the logic controller; and
the memory member stores information relating to the decision result when frame synchronization is established by the synchronization member.

14. An method comprising:
converting an in-phase signal of a differential phase modulated optical signal into a first electrical signal;
converting a quadrature signal of the differential phase modulated optical signal into a second electrical signal;
determining logic states of the first and second electric signals; and
controlling the logic states in accordance with stored information relating to the determination of the logic states,
wherein the optical receiver further comprises a synchronization member establishing frame synchronization of the first and second electrical signals for which logic states were controlled by the logic controller; and
the memory member stores information relating to the decision result when frame synchronization is established by the synchronization member.

* * * * *